US011172100B2

United States Patent
Nakagawa (10) Patent No.: US 11,172,100 B2
(45) Date of Patent: Nov. 9, 2021

(54) IMAGE PROCESSING APPARATUS AND NON-TRANSITORY COMPUTER READABLE MEDIUM STORING PROGRAM THAT PERFORM COLLECTION OF INFORMATION ITEMS BASED ON ACQUIRED COLLECTION INFORMATION FOR EACH OF ONE OR MORE INFORMATION ITEMS

(71) Applicant: FUJIFILM Business Innovation Corp., Tokyo (JP)

(72) Inventor: Tomoka Nakagawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 251 days.

(21) Appl. No.: 16/209,969

(22) Filed: Dec. 5, 2018

(65) Prior Publication Data
US 2019/0268501 A1 Aug. 29, 2019

(30) Foreign Application Priority Data
Feb. 26, 2018 (JP) .............................. JP2018-031867

(51) Int. Cl.
*H04N 1/56* (2006.01)
*G06K 9/60* (2006.01)
(Continued)

(52) U.S. Cl.
CPC ............. *H04N 1/56* (2013.01); *G06F 3/1237* (2013.01); *G06K 9/60* (2013.01); *H04N 1/00206* (2013.01); *H04N 1/00209* (2013.01)

(58) Field of Classification Search
USPC ....... 358/1.1–3.29, 1.11–1.18; 717/168–178; 726/1–7, 16–34
See application file for complete search history.

(56) References Cited

U.S. PATENT DOCUMENTS 10,740,811 B2 * 8/2020 Terada ............... G06Q 30/0617
2006/0064741 A1 * 3/2006 Terao ..................... H04L 63/083
726/4
(Continued)

FOREIGN PATENT DOCUMENTS

JP 2017102627 6/2017

OTHER PUBLICATIONS

Panasonic Corporation, "Realization of Multi-use Image Recognition System: Development of "Vieureka Platform" for Cloud that Utilizes IP Camera as IoT Device First in Field", Jun. 7, 2017 [searched on Feb. 9, 2018], with English translation thereof, Available at <http://news.panasonic.com/jp/press/data/2017/06/jn170607-1/jn170607-1.html>.

*Primary Examiner* — Marcellus J Augustin
(74) *Attorney, Agent, or Firm* — JCIPRNET (57) ABSTRACT

An image processing apparatus includes an image processing section that performs processing of a job relating to image processing, one or more information processing sections that perform processing on one or more information items as processing targets among information items generated by a device group, a permission acquisition section that acquires a collection permission for each of one or more information items used by the one or more information processing sections, from a manager of the device group or the image processing apparatus, and a collection section that collects the information items used by the one or more information processing sections from devices that generate the information items, under a condition in which acquisition of the collection permission for each of the information items from the manager is completed.

20 Claims, 7 Drawing Sheets

(51) Int. Cl.
*G06F 3/12* (2006.01)
*H04N 1/00* (2006.01)

(56) References Cited

U.S. PATENT DOCUMENTS

| | | | |
|---|---|---|---|
| 2012/0036220 A1* | 2/2012 | Dare | H04L 67/04 709/217 |
| 2013/0152174 A1* | 6/2013 | Raley | H04L 63/0823 726/4 |
| 2016/0057295 A1* | 2/2016 | Miyazawa | H04N 1/32117 358/1.14 |
| 2016/0149863 A1* | 5/2016 | Walker | H04L 63/0263 726/1 |
| 2017/0076099 A1* | 3/2017 | Yao | G06F 21/562 |
| 2019/0147164 A1* | 5/2019 | Wing | G06F 21/575 726/24 |

* cited by examiner

| DATA ID | COLLECTION DESTINATION INFORMATION | STATUS | PROVISION DESTINATION LOGIC |
|---|---|---|---|
| data1 | DEVICE A, B, C | BEING COLLECTED (10/15/2016 START) | LOGIC 1 |
| data2 | - | COLLECTION PERMITTED | - |
| data3 | DEVICE A, B, D | BEING COLLECTED (5/12/2017 START) | LOGIC 1 |
| data4 | DEVICE E | COLLECTION PERMITTED | - |
| data5 | DEVICE E, F | BEING COLLECTED (4/2/2017 START) | LOGIC 2, 3, 4 |
| data6 | - | COLLECTION PROHIBITED | - |
| data7 | DEVICE G | COLLECTION PERMITTED (NOTIFICATION REQUIRED) | - |
| data8 | DEVICE H | APPLICATION REQUIRED | - |
| ⋮ | ⋮ | ⋮ | ⋮ |

IMAGE PROCESSING APPARATUS AND NON-TRANSITORY COMPUTER READABLE MEDIUM STORING PROGRAM THAT PERFORM COLLECTION OF INFORMATION ITEMS BASED ON ACQUIRED COLLECTION INFORMATION FOR EACH OF ONE OR MORE INFORMATION ITEMS

CROSS-REFERENCE TO RELATED APPLICATIONS

This application is based on and claims priority under 35 USC 119 from Japanese Patent Application No. 2018-031867 filed Feb. 26, 2018.

BACKGROUND

(i) Technical Field

The present invention relates to an image processing apparatus and a non-transitory computer readable medium storing a program.

(ii) Related Art

The era of the Internet of things (IoT) in which not only a personal computer or a server but also various devices such as home appliances, security devices, automobiles, medical devices, office devices, industrial devices, and various sensors are connected to the Internet has arrived. Such various devices connected to the Internet are also referred to as IoT devices. Various kinds of information which are detected or generated by IoT devices are collected via the Internet and analyzed, and thus are utilized.

A mechanism of edge computing is also spreading with the spread of cloud computing in recent years. The edge computing means a mechanism in which a portion of processing which has been performed by the central cloud or server in the related art is taken over by servers (referred to as edge servers) which are distributed and disposed at positions close to users, and thus load balancing is achieved or the delay of communication is prevented.

In addition, a mechanism as follows has been developed. That is, an edge server collects pieces of data from an IoT device group or performs primary analysis of the collected pieces of data. The edge server transmits an analysis result to the cloud and thus the cloud performs closer analysis or summarization.

In a system disclosed in JP2017-102627A, IoT devices have a short-range wireless communication function and perform data communication with a data relay device such as a smart phone, a wireless router, or an access point. The data relay device has wide-area communication means for connection with the Internet. The data relay device relays all pieces of data transmitted from IoT devices to a server on the Internet by a software gateway function which has been installed, and the server performs authentication of each of the IoT devices.

In ""Vieureka platform" for cloud that utilizes an IP camera as an IoT device is developed first in field" ([online], Panasonic Corporation, Jun. 7, 2017, [searched on Feb. 9, 2018], <URL:http://news.panasonic.com/jp/press/data/2017/06/jn170 607-1/jn170607-1.html>), a system in which a computer mounted in an Internet protocol (IP) camera (so-called network camera) performs image recognition on an image captured by the camera and transmits an image recognition result to a cloud is disclosed. In the system, a function of the cloud replacing the image recognition function of the IP camera is provided.

In a business that provides a service of collecting and analyzing pieces of information detected or generated by an IoT device group, the IoT device group may be installed in facilities on the customer side, but a cloud or a server that analyzes the pieces of information may be operated by a service provider. The information detected or generated by the IoT device group may include information desired to be kept confidential by the customer.

SUMMARY

Aspects of non-limiting embodiments of the present disclosure relate to an image processing apparatus and a non-transitory computer readable medium storing a program in which an occurrence of a situation in which an information item whose collection is not permitted among information items generated by a device group is collected by an image processing apparatus for an information processing section without limit is prevented.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an image processing apparatus which includes an image processing section that performs processing of a job relating to image processing, one or more information processing sections that perform processing on one or more information items as processing targets among information items generated by a device group, a permission acquisition section that acquires a collection permission for each of one or more information items used by the one or more information processing sections, from a manager of the device group or the image processing apparatus, and a collection section that collects the information items used by the one or more information processing sections from devices that generate the information items, under a condition in which acquisition of the collection permission for each of the information items from the manager is completed.

BRIEF DESCRIPTION OF THE DRAWINGS

Exemplary embodiment(s) of the present invention will be described in detail based on the following figures, wherein.

DETAILED DESCRIPTION

Figure 1:
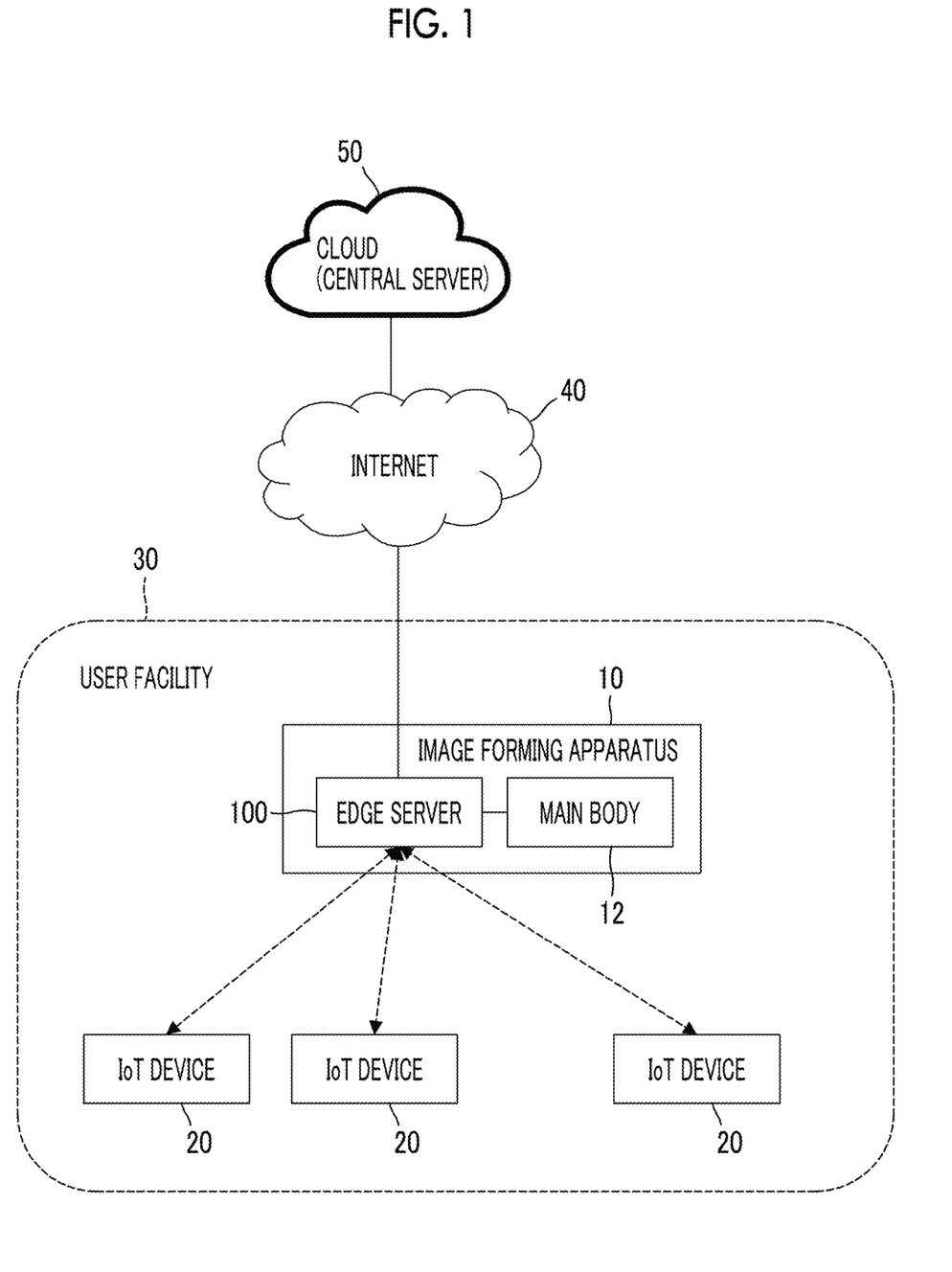
FIG. 1 is a diagram illustrating an example of a system to which a mechanism according to an exemplary embodiment is applied.

Firstly, an example of a system to which a mechanism according to an exemplary embodiment of the present invention is applied will be described with reference to FIG. 1.

The system includes an image forming apparatus 10 and a plurality of IoT devices 20 which are provided in a user facility 30. The user facility 30 is a facility (for example, office) of a user using a service provided by a cloud 50. Here, it is assumed that a user operating the user facility 30 means an organization such as a company (referred to as "a user organization" below) as an example.

The IoT device 20 has a function of transmitting detected information or information generated by processing to other devices by wired or wireless data communication. For example, the IoT device 20 communicates with the image forming apparatus 10 or other devices by using a wireless communication protocol such as Wi-Fi (registered trademark) or Bluetooth (registered trademark). In a case where the user facility 30 is an office in a company, examples of the IoT device 20 may include various sensors such as temperature sensors or human body sensors; communication devices such as wireless routers or gateways; office devices such as printers or copiers; lighting devices such as LED lamps; security/management devices such as entrance and exit management devices; and portable terminals such as smart phones and personal computers which are used by each person in the user facility 30. Each of the various devices may have a function of transmitting information detected by a built-in sensor or information generated by processing of a built-in circuit or program to the outside of the device.

The image forming apparatus 10 forms an image in a certain manner such as printing or scanning. As an example of the image forming apparatus 10, a printer, a scanner, a copying machine, a facsimile machine, or a digital multi-function machine having the above functions is provided. The image forming apparatus 10 includes a main body 12 and an edge server 100.

The main body 12 performs the main function of the image forming apparatus 10. For example, in a case where the image forming apparatus 10 is a multifunction machine, the main body 12 is configured with hardware or software for functions of a printer, a scanner, a facsimile, and the like (for example, printing mechanism, paper transporting mechanism, scanning mechanism, original document feeding mechanism, computer for control processing). The main body 12 performs processing (for example, printing, scanning, copying, or facsimile transmission) in according to an instruction from a user, that is, performs a job. The job includes a job which is automatically performed in accordance with setting information which is set in advance by a user. The main body 12 may include various sensors for controlling an image forming function, for example, a residual paper quantity sensor, a residual toner amount sensor, and a sensor group that detects passing of paper on a paper transport path. The main body 12 may transmit pieces of information detected by the sensors or information generated by processing which is performed by the image forming apparatus, to the edge server 100. In this sense, the main body 12 may be regarded as one IoT device in a case of being viewed from the edge server 100.

The edge server 100 collects pieces of data from the group of the IoT device 20 or the main body 12 and performs information processing using the collected pieces of data. An example of a case where information processing performed on pieces of data collected from the group of the IoT device 20 or the main body 12 by the edge server 100 refers to an analysis of data will be described below. However, the method according to the exemplary embodiment may be applied to image processing other than the analysis.

The edge server 100 transmits the collected pieces of data or pieces of data as processing results obtained by processing (for example, analyzing) the pieces of data, to the cloud 50 via the Internet 40. The cloud 50 is an information processing system configured with one computer or a plurality of computers cooperating with each other. The cloud 50 performs information processing for a user organization by using data received from the edge server 100. Such information processing is just an example. For example, as the image processing, for example, processing of analyzing a situation of the user facility 30 or the user organization or processing of specifying various solutions corresponding to the situation may be provided. As described above, the edge server 100 and the cloud 50 constitute an edge computing system. That is, the cloud 50 refers to the central server, and a device that performs processing in cooperation with the central server in the vicinity of the user corresponds to the edge server 100.

For example, the edge server 100 may be mounted in a form of a server program executed on the computer of the main body 12. As another example, the edge server 100 may be mounted in a form of a computer separate from the computer of the main body 12.

A functional configuration of the edge server 100 will be described with reference to FIG. 2. The edge server 100 includes one or more analysis logics 102, a collection unit 104, a collection management unit 106, a communication unit 108, and a logic addition-and-update unit 110.

The analysis logic 102 performs analysis of one or more data items collected from one or more IoT devices 20. Such an analysis logic 102 is just an example. For example, logics as follows are provided: a logic that analyzes and suggests a cloud cooperation solution suitable for the environment of a user from use situations of a portable terminal of each person in the user facility 30 and the main body 12 of the image forming apparatus 10; a logic that analyzes and suggests the best rate plan for the user facility 30 from the use situation of the portable terminal; and a logic that analyzes and suggests a power saving control method suitable for the use situation of lighting in the user facility 30. In the above examples, information indicating the solution, the rate plan, the power saving control method, or the like obtained by the analysis logic 102 is transmitted to the cloud 50. The cloud 50 provides a user destination (for example, e-mail address of a system manager of the user organization) with explanatory materials such as the solution indicated by the received information.

A data item needed for analysis by the analysis logic 102 is determined for each analysis logic 102. The collection unit 104 collects a data item group used for analysis by the analysis logic 102, from the group of the IoT device 20 and the main body 12.

Here, a data item detected or generated by the group of the IoT device 20 or the main body 12 (collectively referred to as "the group of the IoT device 20" below) corresponds to information on the user organization. The data item includes information desired to be kept confidential from the outside by the user organization. A service provider operating the cloud 50 is the third party to the user organization. Thus, it is not desired for information security of the user organization that the edge server 100 that transmits information to the cloud 50 collects data items from the group of the IoT device 20 in the user facility 30 without limit. Even in a case where the edge server 100 does not transmit information to the cloud 50, the edge server 100 communicates with the cloud 50 for additional installation of a new analysis logic 102 or an update of the provided analysis logic 102 as will be described later. Thus, as described above, a user organization that does not wish to permit collection of sensitive data item to the edge server 100 may be provided.

Figure 3:
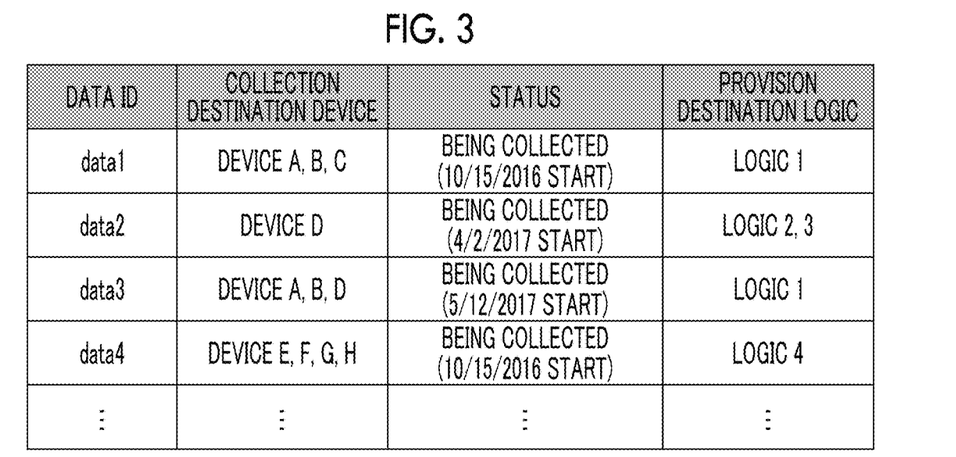
FIG. 3 is a diagram illustrating contents of a management table of a collection management unit.

Thus, in the exemplary embodiment, the collection management unit 106 is provided such that the user organization manages collection of a data item group from the group of the IoT device 20 by the collection unit 104. The collection management unit 106 manages a management table for a data item whose collection is permitted by the user organization. FIG. 3 illustrates the contents of the management table managed by the collection management unit 106. The management table illustrated in FIG. 3 includes items such as a data ID, a collection destination device, a state, and a provision destination logic.

"The data ID" refers to identification information of the type of data item. As the type of data item, for example, various types such as a temperature, humidity, a turning-on time point and a turning-off time point of lighting, detection data of a human body sensor, a time point and a duration of a call of a portable phone, and an access destination of data communication of a portable terminal may be provided. Various kinds of information generated by the image forming apparatus 10, for example, information of a performing time point or a processing quantity (number of sheets) of a job (for example, copying, printing, and scanning) by the image forming apparatus 10 are also provided as the example of the type of data item as a collection target. Although not illustrated, the data ID is associated with information (for example, "detection information of a human body sensor for lighting control") describing the type of data item, which is indicated by the data ID by words that people understand.

"The collection destination device" refers to identification information of an IoT device 20 (or main body 12) as a collection destination that collects a data item corresponding to the data ID. The identification information may be a communication address (for example, IP address or MAC address) of an IoT device 20 or the like as the collection destination, which is used in communication in a case where the data item is collected, or be another type of identification information which may uniquely specify the communication address.

"The state" means a state regarding collection of the data item. In the example in FIG. 3, only "being collected" is described as a value of "the state" because only a data item of which a permission for collection is obtained from the user organization and then which is collected is registered in the management table. In another example (FIG. 7) which will be described later, another "state" is described. Regarding the data item of "being collected", information of a timing (for example, date and time) at which the collection starts may be recorded in the management table.

"The provision destination logic" refers to identification information of an analysis logic 102 as a provision destination of the data item collected by the collection unit 104. That is, an analysis logic 102 having identification information included in the field of "the provision destination logic" receives a data item from the collection unit 104 and performs analysis processing using the received data item.

Figure 2:
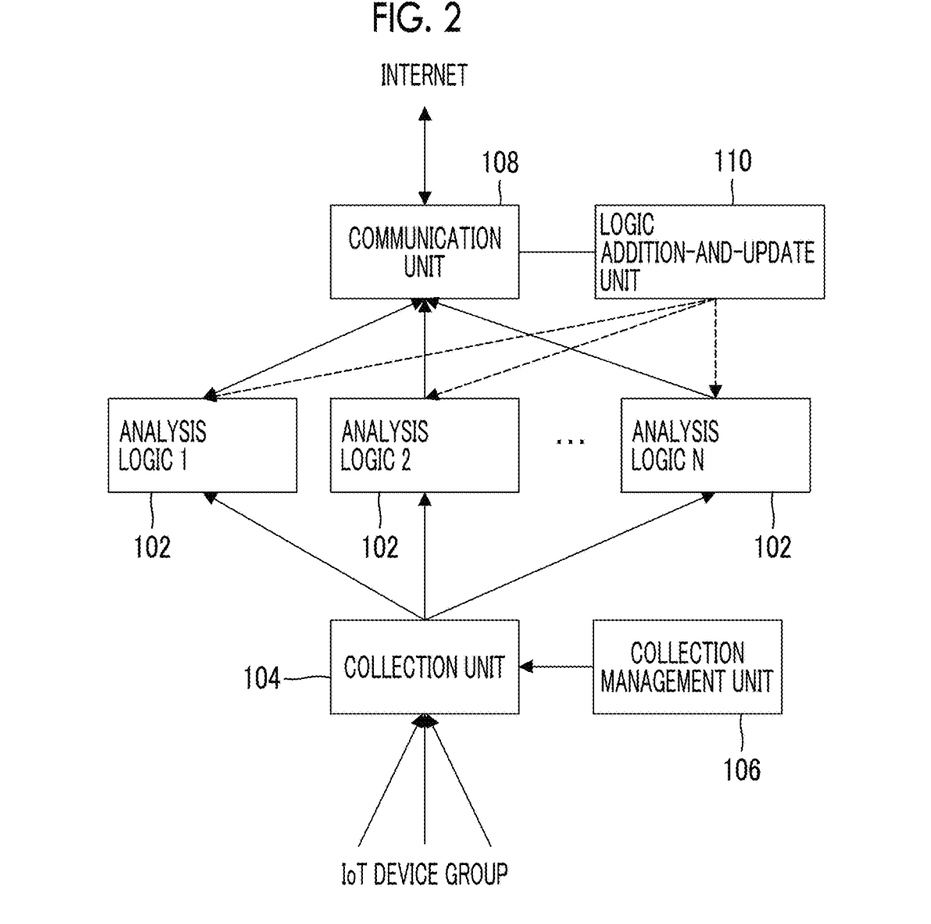
FIG. 2 is a diagram illustrating a functional configuration of an edge server.

Returning to the description of FIG. 2, the collection unit 104 collects data items from the group of the IoT device 20 with reference to the management table of the collection management unit 106. For example, the data item is regularly collected or is collected every time the IoT device 20 detects or generates new data.

The collection management unit 106 performs processing of acquiring a collection permission of a data item serving as a new collection target from the user organization, corresponding to addition of an analysis logic 102 or an update of the analysis logic 102 by the logic addition-and-update unit 110 which will be described later. The processing of acquiring the collection permission is performed for a manager having information which is registered in the collection management unit 106 in advance, for example. The manager may be a system manager of the user organization, a manager of a specific image forming apparatus 10, or a manager set for managing the group of the IoT device 20. A plurality of managers may be provided, and an IoT device 20 which is associated with each of the managers and is managed by the corresponding manager may be determined. In this case, the collection permission of a data item serving as a new collection target is performed for a manager of an IoT device 20 that supplies the data item.

Here, in a case where a data item acquired from an IoT device 20 is used for controlling or managing the function (for example, scanning, printing, copying, or facsimile) of the main body 12, this means data collection for the original function of the image forming apparatus 10. Thus, the collection may automatically start without a need for the collection permission of the manager. On the contrary, a data item needed by the analysis logic 102 may be provided for much various kinds of processing, which are different from the original function of the image forming apparatus 10. Thus, a collection permission for the data item needed by the analysis logic is obtained from the manager, and then collection of the data item is possible.

The communication unit 108 communicates with the cloud 50 via the Internet 40, in order to transmit an analysis result or to add or update an analysis logic 102.

The logic addition-and-update unit 110 installs (adds) a new analysis logic 102 on the edge server 100 or updates the analysis logic 102 which has been already installed on the edge server 100. A new analysis logic 102 or an update version of the provided analysis logic 102 is provided for the edge server 100 from the cloud 50. For example, the logic addition-and-update unit 110 regularly inquires whether or not a new analysis logic 102 or an update version of the provided analysis logic 102 is provided, from the cloud 50. In a case where the new analysis logic 102 or the update version of the analysis logic is provided, the new analysis logic 102 or the updated version is automatically downloaded, and then installation thereof or update processing is performed. The logic addition-and-update unit 110 may install a new analysis logic 102 or update the analysis logic in accordance with an instruction from the manager of the user organization, for example.

Next, processing of acquiring a collection permission for a data item will be described with reference to FIGS. 4 to 6. The processing of acquiring a collection permission is performed by the collection management unit 106 when a new analysis logic 102 is installed or the provided analysis logic 102 is updated.

Figure 4:
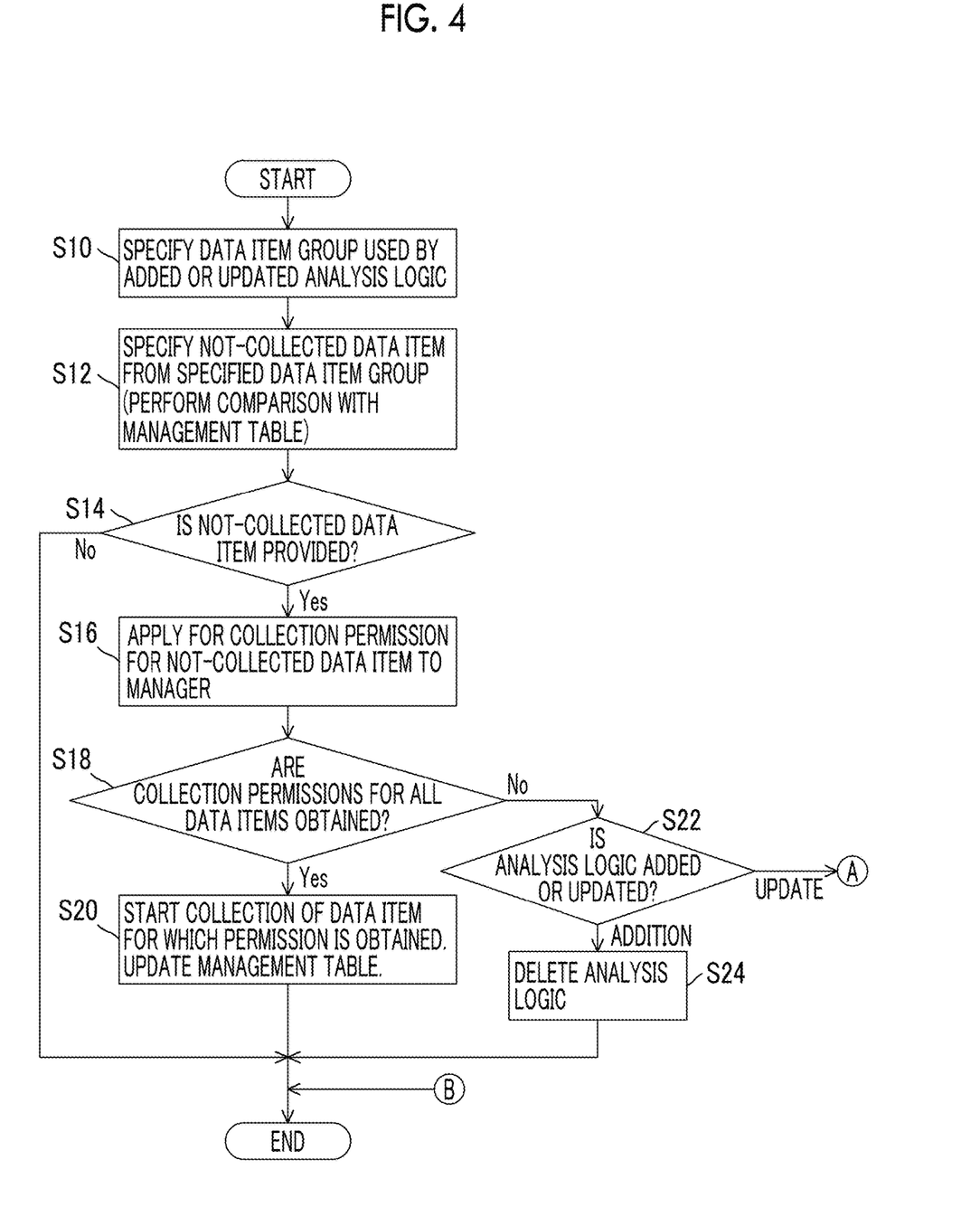
FIG. 4 is a diagram illustrating a portion of a processing procedure of the collection management unit.

In the procedure in FIG. 4, firstly, in a case where the collection management unit detects that the analysis logic 102 is added or updated by the logic addition-and-update unit 110, the collection management unit 106 specifies a data item used for analysis by the added or updated analysis logic 102 (S10). For example, a list of a data ID of a data item used by the analysis logic 102 (updated analysis logic in a case of update version data) is attached as attribute information, to the analysis logic 102 or the update version data provided for the edge server 100 from the cloud 50. The collection management unit 106 specifies a data item group used by the analysis logic 102, from the attribute information.

Then, the collection management unit 106 examines whether or not a not-collected data item (that is, data item having a state which is not "being collected") is provided in the data item group specified in S10, with reference to the management table (FIG. 3) (S12). The collection management unit determines whether or not a not-collected data item is provided in the data item group specified in S10 (S14). In a case where the not-collected data item is not provided at all, the collection management unit ends the processing.

In a case where the collection management unit determines that the not-collected data item is provided, in S14, the collection management unit 106 applies for a collection permission for the not-collected data item to a predetermined manager of the user organization (S16). As the manager as an application destination, for example, a manager of the edge server 100, a manager of the image forming apparatus 10, and a network manager of the user organization are provided. In the application processing, for example, the collection management unit 106 transmits an application notification of the collection permission for the data item to the manager by using notification destination information (for example, e-mail address) of the manager, which has been registered in advance. Alternatively, when the manager performs log-in, the collection management unit displays the application notification of the collection permission on a management screen provided by the edge server 100. For example, the application notification of the collection permission includes specification information (for example, uniform resource locator (URL)) for specifying a setting screen of a collection permission, which is configured in a form of a web page or the like. The manager causes the setting screen to be displayed (for example, in a portable terminal or a personal computer of the manager, or on a local operation screen of the image forming apparatus 10) by using the specification information.

Figure 5:
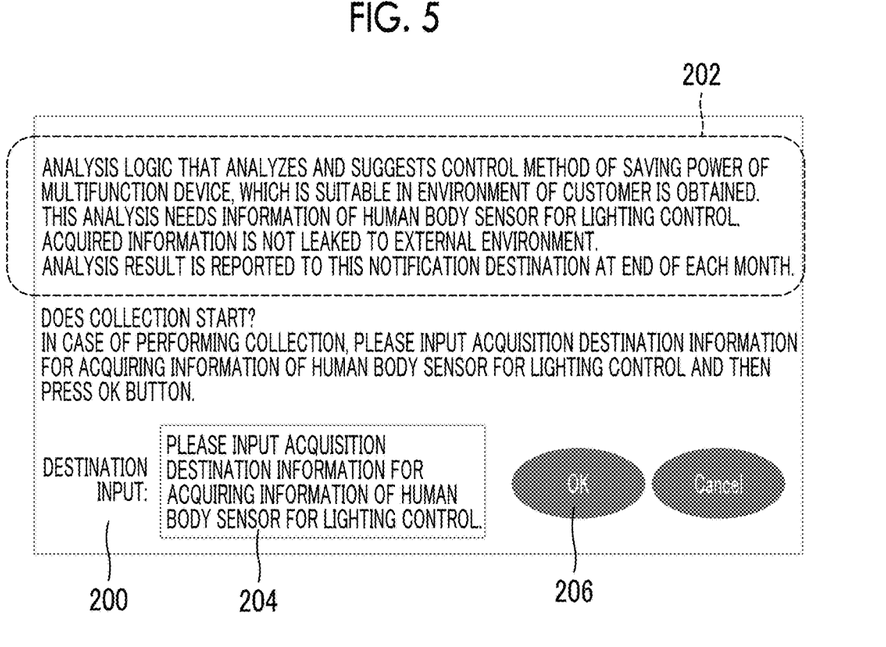
FIG. 5 is a diagram illustrating an example of a setting screen of a collection permission, which is presented to a manager by the collection management unit.

FIG. 5 illustrates an example of a setting screen 200 of a collection permission. The illustrated setting screen 200 is provided for each not-collected data item specified in S12. An explanation 202 of a not-collected data item as a target of a collection permission is included in the setting screen 200. For example, the explanation 202 includes an explanation (in the example in FIG. 5, "an analysis logic that analyzes and suggests a control method of saving power of a multifunction machine") of an analysis logic 102 (added or updated at this time) using the data item or an explanation (in the example in FIG. 5, "information of a human body sensor for lighting control") of the data item. The explanation 202 in the example in FIG. 5 includes a message indicating that the collected data item itself is not leaked to an external environment (for example, cloud 50) or an explanation of a method of providing an analysis result of the analysis logic (in the example in FIG. 5, notification to the manager at the end of each month). In a case where the collected data item or an analysis result thereof is leaked to the external environment, the leaked information and the leakage destination (for example, cloud 50) may be displayed in the explanation 202.

An input field 204 of "a destination" information for specifying the IoT device 20 or the like as a collection destination of the data item as the target of the collection permission is provided in the setting screen 200. In a case where the manager reads the explanation 202 and determines to permit collection of the data item, the manager inputs information of specifying an IoT device 20 or the like that outputs the data item (for example, identification information or address information of the IoT device 20 on the network of the user organization) to the input field 204. In a case where the IoT device 20 as the collection destination is capable of outputting a plurality of data items, the manager further inputs information (for example, identification name of the data item) for specifying a data item whose collection is permitted among the plurality of data items to the input field 204. After this input, in a case where the manager presses an "OK" button 206, the collection management unit 106 determines that the collection permission for the data item has been obtained, and records information of an IoT device 20 indicated by the information input in the input field 204, as a collection destination of the data item. In a case where a plurality of not-collected data items specified in S12 is provided, the above-described operations repeat for all the not-collected data items. A setting screen for collectively receiving an input for collection permissions for a plurality of data items may be provided.

Instead of inputting the "destination" information of the data item to which a collection permission is given by the manager, the collection management unit 106 may automatically acquire the "destination" information. For example, the collection management unit 106 may obtain information of a data item capable of being provided by an IoT device 20, from the IoT device 20 capable of communicating with the edge server. In a case where application for a collection permission for the data item to the manager is performed, a list of an IoT device 20 capable of providing the data item is shown on the setting screen 200, and a permission for collecting the data item is obtained from the IoT device 20.

In a case where a user interface for inputting an instruction to set a data item to be in a collection prohibition state is provided in the setting screen 200, and such an instruction is input, the collection management unit 106 may change the state of the data item in the management table to be "collection prohibition". In a case where a data item whose collection is needed because of addition or an update of an analysis logic 102 is in a state of "collection prohibition", the collection management unit 106 does not apply for a collection permission to the manager and performs processing in a state where the collection permission for the data item has not been obtained. Since "collection prohibition" may be designated, bothering by repetitive application for the collection permission for a data item of which the manager desires collection to be prohibited, from now on, does not occur.

Returning to the descriptions in FIG. 4, the collection management unit 106 determines whether or not collection permissions for all not-collected data items specified in S12 are obtained in S16 (S18). In a case where the determination result of S18 is Yes, the collection management unit registers information of each of the data items in the management table (FIG. 3) (S20). That is, the collection management unit adds a data ID of each of the data items, information of the collection destination device (information input to the input field 204), the state ("being collected"), and a provision destination logic (identification information of an analysis logic 102 which is added or updated at this time) to the management table. Thus, the collection unit 104 starts collection of each of the above data items.

In the example in FIG. 4, in a case where the collection permissions for all not-collected data items specified in S12 are not obtained from the manager (the determination result of S18 is No), collection is not performed even though collection permissions for some data items among the above not-collected data items have been obtained. This is because, if even one data item whose collection is not possible is provided, performing analysis processing of the corresponding analysis logic 102 is not possible. That is, in this example, an occurrence of a situation in which a data item is collected from an IoT device 20 and the like for analysis which is not performed is prevented.

More specifically, in a case where the determination result of S18 is No, the collection management unit 106 determines whether addition of the new analysis logic 102 or an update of the analysis logic 102 functions as a trigger of the processing in FIG. 4 at this time (S22). In a case where the determination result is "addition", the collection management unit 106 notifies the logic addition-and-update unit 110 that the collection permission for the data item for the added analysis logic 102 has not been obtained. As a response, the logic addition-and-update unit 110 deletes (uninstalls) the added (installed) analysis logic 102 (S24). In this case, the data item specified in S12 is not collected.

Figure 6:
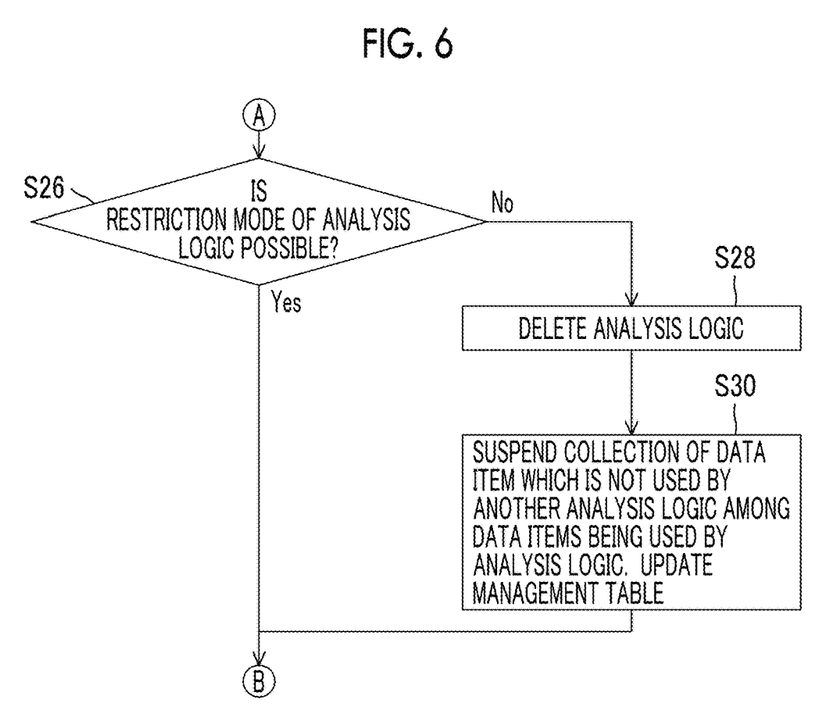
FIG. 6 is a diagram illustrating the remaining portion of the processing procedure of the collection management unit.

In a case where the determination result in S22 is "update", the collection management unit 106 causes the process to the procedure illustrated in FIG. 6. In this case, the collection management unit 106 determines whether or not the updated analysis logic 102 being performed in "a restriction mode" is possible (S26). The restriction mode means a mode in which an analysis restricted to use only a data item group collected before the update is performed. Even in a case where the analysis logic 102 may perform an advanced analysis to which a new data item has been added, by the update, determination of "restriction mode possible" is obtained in a case where performing the old analysis which does not use the new data item is possible. Information of whether or not the restriction mode is possible is attached to data of the analysis logic 102, as attribute information. Thus, the collection management unit 106 performs the determination in S26 with reference to the attribute information thereof.

In a case where the determination result in S26 is Yes (restriction mode is possible), the collection management unit 106 ends the processing without updating the management table. In this case, collection of the data item of which a permission for collection has been obtained from the manager in S16 is not started. The updated analysis logic 102 performs an analysis in the restriction mode only by using the data item in a state of "being collected" before the update.

In a case where the determination result in S26 is No, it is not possible that the updated analysis logic 102 performs the analysis, so long as all data items to be used are not aligned. In addition, some data items for which collection permissions have not been obtained are provided among the data items. Consequently, performing the analysis is not possible. In this case, the collection management unit 106 notifies the logic addition-and-update unit 110 that the collection permission for a data item for the updated analysis logic 102 has not been obtained. As a response, the logic addition-and-update unit 110 deletes (uninstalls) the updated analysis logic 102 (S28). Thus, the analysis logic 102 which has not been performed is deleted from the edge server 100 at all, and thus the edge server 100 has available resources. The collection management unit 106 specifies a data item collected for the deleted analysis logic 102 (that is, data item in which "the provision destination logic" includes the analysis logic 102), and updates information of the specified data item in the management table (FIG. 3) (S30). That is, the collection management unit deletes a data item in which another analysis logic 102 is not provided in "the provision destination logic" among specified data item, from the management table. The collection management unit deletes the deleted analysis logic 102 from "the provision destination logic" of a data item in which another analysis logic 102 is provided in "the provision destination logic".

Next, a modification example of the exemplary embodiment will be described. In the exemplary embodiment, when the analysis logic 102 is added or updated, a collection permission for a not-collected data item used in the analysis logic 102 is obtained from the manager. On the contrary, in the modification example, the manager may previously set the collection permission for a data item, that is, before collection of the data item is needed by addition or an update of the analysis logic 102. The previous collection permission is set, for example, in "the state" for the data item.

Figure 7:
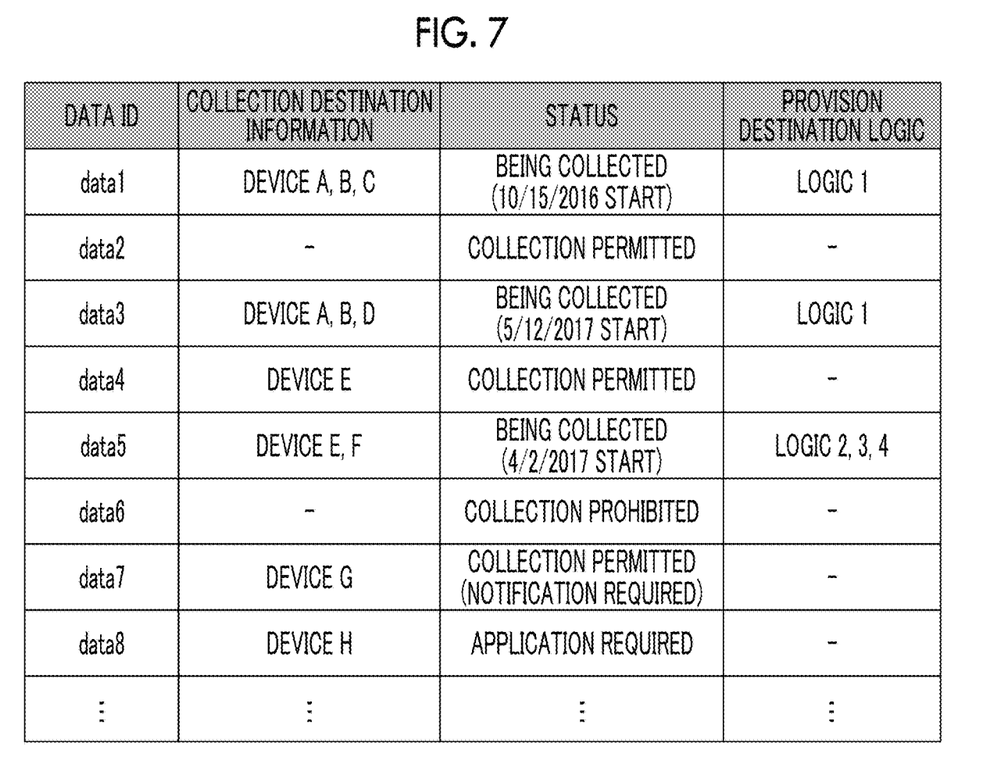
FIG. 7 is a diagram illustrating contents of a management table of a collection management unit in a modification example.

FIG. 7 illustrates the management table of the collection management unit 106 in the modification example. Items of the management table in the example in FIG. 7 are the same as those in the example in FIG. 3. However, the type of "the state" which may be provided for the data item is various in comparison to that in the case of FIG. 3. As the state of the data item, values of "collection permitted", "collection permitted (notification required)", "application required", "collection prohibition", and the like are provided in addition to "being collected" which is described above.

"Collection permitted" and "collection permitted (notification required)" correspond to states where the previous collection permission for the data item is given. Regarding the latter, in a case where collection of the data item is started, the manager is needed to be notified. However, regarding the former, even though collection is started, a notification of this is not needed. The manager sets "collection permitted (notification required)" as the state for a data item which may be collected in a case of being needed, but for which the manager desires being notified of a start of the collection. A data item having a state of "being collected" is collected by the collection unit 104. A data item having a state of "collection permitted" or "collection permitted (notification required)" is not collected.

"Application required" corresponds to a state where application to the manager is needed in order to obtain the collection permission for the data item. In a case where collection of a data item in which this state has been set is needed, the collection management unit 106 applies for a collection permission to the manager, similar to the exemplary embodiment.

"Collection prohibition" corresponds to a state indicating that collection of the data item is not permitted. In a case where collection of a data item in which this state has been set is needed, the collection management unit 106 does not inquire the manager and determines that the collection permission for the data item is not obtained.

For a data item having a state other than "being collected", "the provision destination logic" is not determined. Regarding "the collection destination device", the manager may set a device which is capable of outputting the data item in advance.

The processing procedure of the collection management unit 106 in the modification example will be described with reference to FIGS. 8 and 9.

In the processing procedure, in a case where the collection management unit detects that the analysis logic 102 has been added or updated, the collection management unit 106 specifies a data item used in analysis by the added or updated analysis logic 102 (S40). Then, the collection management unit 106 acquires the state of the specified data item from the management table (FIG. 7) (S42).

Then, the collection management unit 106 determines whether or not a data item having a state of "collection prohibition" is provided among the data items specified in S40 (S44). In a case where the determination result is Yes, it is not possible that the analysis logic 102 which has been added or updated at this time completely performs analysis processing, or the analysis logic 102 which has been added or updated at this time may perform the analysis processing only in the restriction mode. In this case, the collection management unit 106 determines whether addition of the new analysis logic 102 or an update of the analysis logic 102 functions as a trigger of the processing in FIG. 8 at this time (S46). In a case where the determination result is "addition", the collection management unit 106 notifies the logic addition-and-update unit 110 that the collection of the data item for the added analysis logic 102 is not possible. As a response, the logic addition-and-update unit 110 deletes (uninstalls) the added (installed) analysis logic 102 (S48). In this case, even though a data item having a state of "collection permitted" is provided among data items needed by the analysis logic 102, the data item is not collected.

In a case where the determination result in S46 is "update", similarly to the case of the exemplary embodiment, the collection management unit 106 causes the process to the processes (S26 to S30) in FIG. 6.

In a case where the determination result in S44 is No (there is no data item of "collection prohibition"), the collection management unit 106 determines whether or not a data item having a state of "application required" is provided in the data item group specified in S40 (S50). In a case where the determination result is No, data items of the data item group specified in S40 have states of "being collected", "collection permitted", or "collection permitted (notification required)". In this case, the collection management unit 106 changes the state of a data item which is "collection permitted" or "collection permitted (notification required)" in the data item group to "being collected" in the management table (S52). The collection management unit notifies the manager that collection of a data item of "collection permitted (notification required)" among the data items starts. With such an update of the management table, collection of the data item of "collection permitted" or "collection permitted (notification required)" is started.

Figure 9:
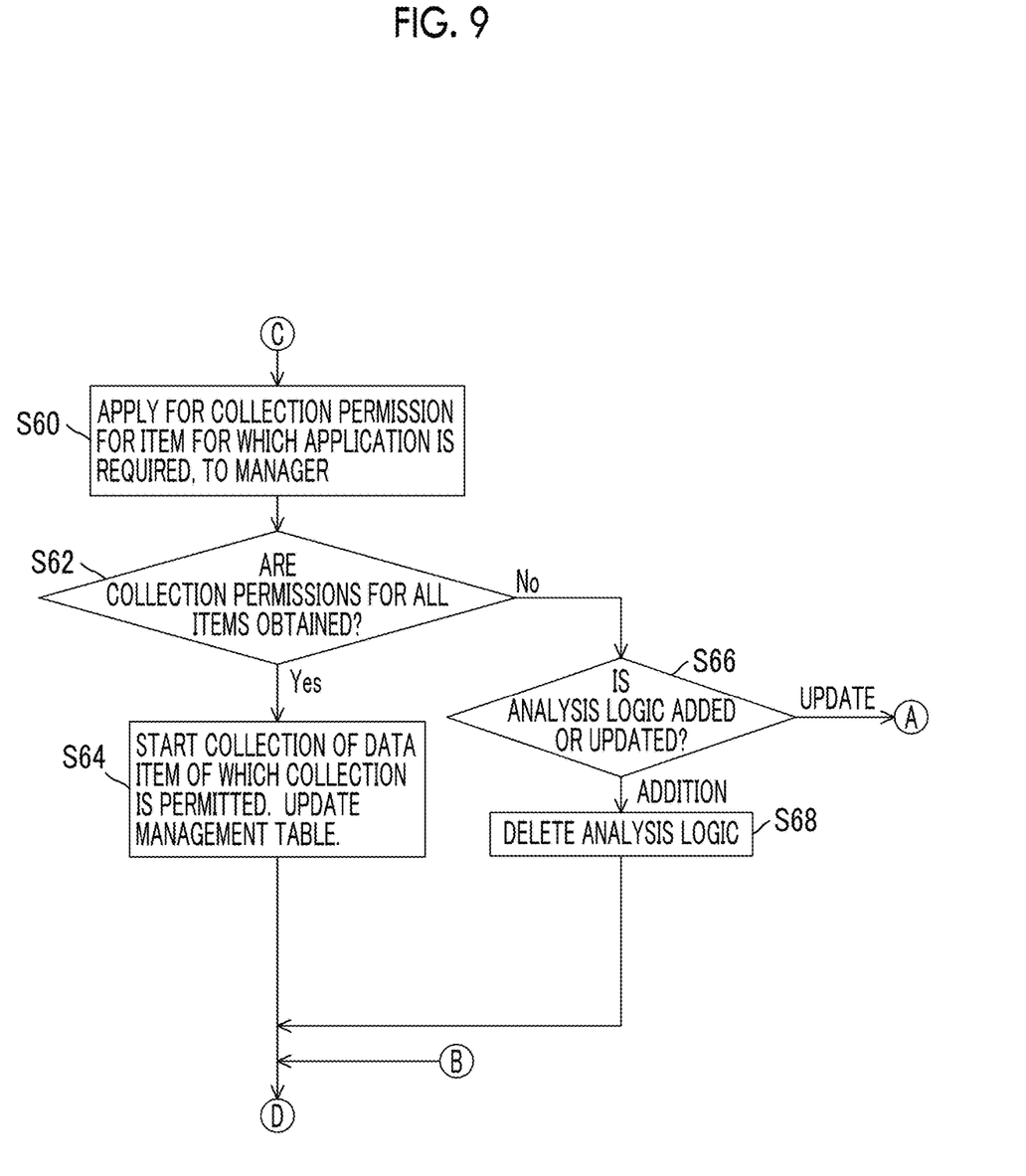
FIG. 9 is a diagram illustrating the remaining portion of the processing procedure of the collection management unit in the modification example.

In a case where the determination result in S50 is Yes, the collection management unit 106 proceeds to processing in FIG. 9. That is, the collection management unit 106 applies for a collection permission for each data item having a state of "application required" determined in S50, to the manager (S60). For example, the setting screen for the data item of "application required", which is illustrated in FIG. 5 is provided for the manager, and thus the application is performed.

Then, the collection management unit 106 determines whether or not collection permissions for all data items having a state of "application required" are obtained from the manager (S62). In a case where the determination result is Yes, the collection management unit 106 updates states of a data item having a state of "collection permitted" or "collection permitted (notification required)" among the data items specified in S40, and a data item for which the collection permission has been obtained in S60, to be "being collected" in the management table (S64). At this time, the collection management unit transmits a notification indicating that collection of the data item having a state of "collection permitted (notification required)" has started, to the manager. With the update of the table in S64, the collection unit 104 starts collection of data items having a state which has been updated to be "being collected".

Figure 8:
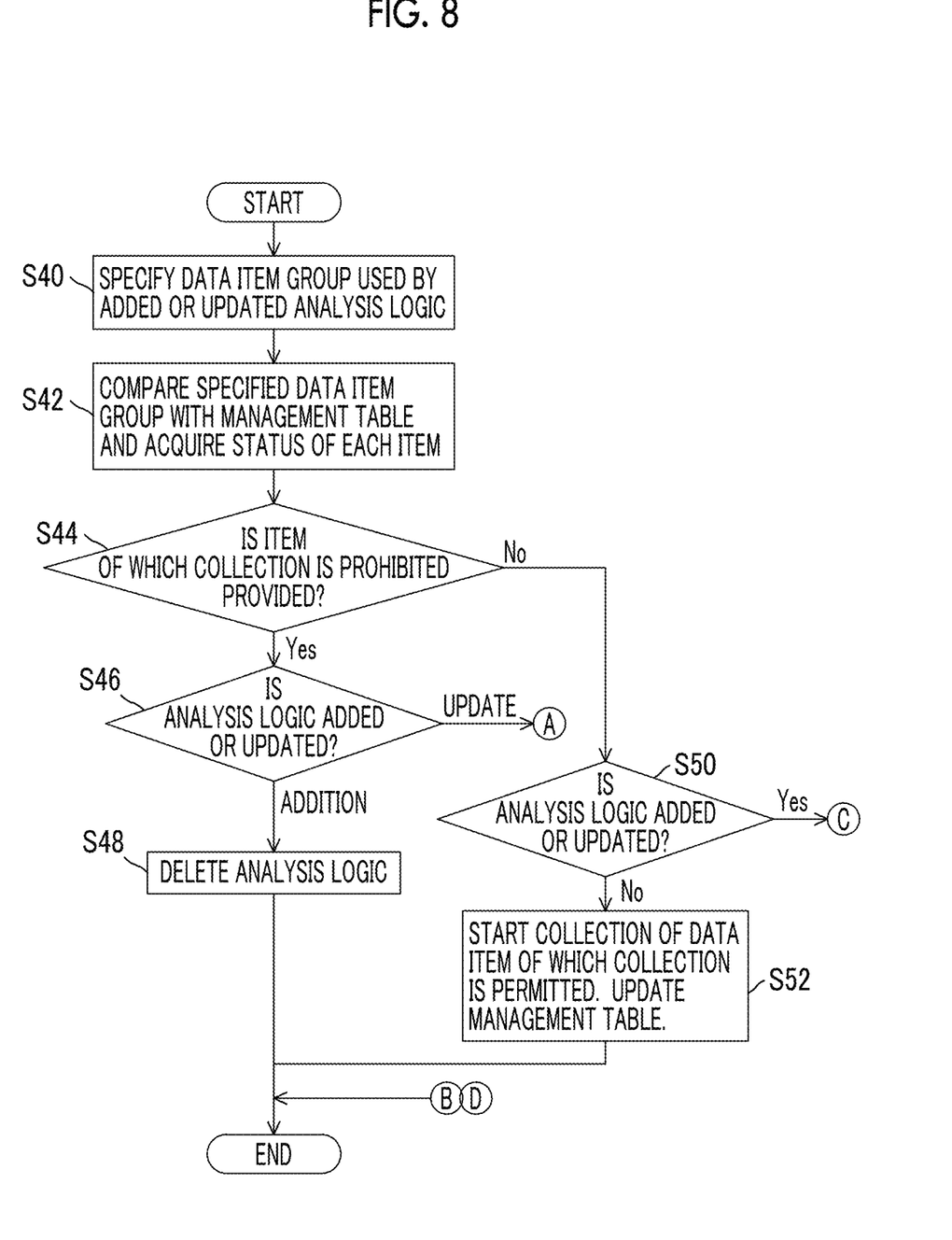
FIG. 8 is a diagram illustrating a portion of a processing procedure of the collection management unit in the modification example.

In a case where the determination result in S62 is No, the collection management unit 106 determines whether addition of the new analysis logic 102 or an update of the analysis logic 102 functions as a trigger of the processing in FIG. 8 (S66). In a case where the determination result is "addition", the collection management unit 106 notifies the logic addition-and-update unit 110 that the collection of the data item for the added analysis logic 102 is not possible. As a response, the logic addition-and-update unit 110 deletes (uninstalls) the added (installed) analysis logic 102 (S68). In a case where the determination result in S66 is "update", the collection management unit 106 causes the process to the processes (S26 to S30) in FIG. 6.

The information processing mechanism of the image forming apparatus 10 or the edge server 100 which are described above may be realized, for example, in a manner that a built-in computer executes a program representing the function of each function module in each device. Here, for example, the computer has a circuit configuration in which a processor such as a CPU, a HDD controller that controls a hard disk drive (HDD) and a memory (primary storage) such as a random access memory (RAM) and a read only memory (ROM), various input and output (I/O) interfaces, a network interface that performs control for a connection with a network such as a local area network, and the like are connected to each other via a bus, as hardware. A disk drive, a memory reader and writer, and the like may be connected to the bus via the I/O interface, for example. The disk drive is used for reading and/or writing data from and in a portable disk recording medium such as a CD or a DVD. The memory reader and writer is used for reading and/or writing data from and in a portable non-volatile recording medium such as a flash memory. A program in which processing contents of each function module described above are described, and which is preserved in a fixed storage device such as a hard disk drive is installed on a computer via a recording medium such as a CD or a DVD, or via communication means such as the network. The function module group described above is realized in a manner that the program stored in the fixed storage device is read to the RAM and then is executed by the processor such as a CPU.

Hitherto, the system in which the edge server 100 mounted in the image forming apparatus 10 collects data items from the group of the IoT device 20 is described. However, the control according to the present invention is not limited to the above-described example. The control according to the present invention may be generally applied to a case where a type of computer other than the edge server 100 collects data items from a device group.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an edge server, comprising a processor, the edge server configured to execute an image processing section that performs processing of a job relating to image processing;
   wherein the processor is configured to execute:
      one or more information processing sections that perform processing on one or more information items as each of processing targets among information items generated by a device group;
      a permission acquisition section that acquires a permission for each of one or more information items used by the one or more information processing sections, from a manager of the device group that generates the information items or the image processing apparatus; and
      a collection section that collects the information items used by the one or more information processing sections from devices that generate the information items, under a condition in which acquisition of the permission for each of the information items from the manager is completed.

2. The image processing apparatus according to claim 1, wherein, in a case where collection of a new information item is needed by addition of a new information processing section or an update of the provided information processing section, the processor executes the permission acquisition section to require a permission for the new information item from the manager.

3. The image processing apparatus according to claim 2, wherein the processor executes a function of the permission acquisition section to receive a collection prohibition instruction indicating that collection of the information item is not permitted regardless of a purpose of the collection, from the manager in a response to the request of the permission for the information item, and
   the processor executes the permission acquisition section to not require the permission for the new information item from the manager, in a case where the collection prohibition instruction for the new information item whose collection is needed at this time is received.

4. The image processing apparatus according to claim 2, wherein the processor executes the permission acquisition section to present a permission acquisition screen to the manager, the permission acquisition screen including explanations for collecting the new information item in order to require the permission for the new information item.

5. The image processing apparatus according to claim 2, wherein the processor further executes:
   a section that deletes the new added information processing section in a case where it is not possible that the permission acquisition section acquires the permission for the new information item from the manager.

6. The image processing apparatus according to claim 2, wherein the processor further executes:
   a section that operates the updated provided information processing section in a restriction mode in a case where it is not possible that the permission acquisition section acquires the permission for the new information item from the manager, the restriction mode being a mode in which an information item collected for the provided information processing section before the update is used, but the new information item is not used.

7. The image processing apparatus according to claim 6, wherein the processor further executes:
   a section that deletes the provided information processing section in a case where it is not possible that the permission acquisition section acquires the permission for the new information item from the manager and it is not possible that the updated provided information processing section operates in the restriction mode.

8. The image processing apparatus according to claim 1, wherein the processor executes the permission acquisition section to receive a pre-registration of the permission for an information item generated by a device capable of communicating with the image processing apparatus, from the manager, and
   the processor executes the collection section to collect a new information item in a case where collection of the new information item is needed by addition of a new information processing section or an update of the provided information processing section, and a pre-registration of the permission for the new information item is provided.

9. The image processing apparatus according to claim 8, wherein the processor executes the permission acquisition section to require the permission for the new information item from the manager in a case where the pre-registration of the permission for the new information item is not provided.

10. The image processing apparatus according to claim 9, wherein the processor further executes:
    a notification section to notify the manager that collection of the new information item is started, in a case where the collection section is executed by the processor to start collection of the new information item by the pre-registration of the permission.

11. The image processing apparatus according to claim 10, wherein the processor executes the notification section to not perform the notification in a case where a message for the notification that collection of the information item starts is not designated with the pre-registration of the permission for the information item.

12. The image processing apparatus according to claim 10, wherein the processor executes the permission acquisition section to receive a pre-registration of collection prohibition for the information item generated by the device capable of communicating with the image processing apparatus, from the manager, and
    the processor executes the collection section to not collect the new information item in a case where the pre-registration of the collection prohibition for the new information item whose collection is needed is provided.

13. The image processing apparatus according to claim 9, wherein the processor executes the permission acquisition section to receive a pre-registration of collection prohibition for the information item generated by the device capable of communicating with the image processing apparatus, from the manager, and the processor executes the collection section to not collect the new information item in a case where the pre-registration of the collection prohibition for the new information item whose collection is needed is provided.

14. The image processing apparatus according to claim 8, wherein the processor further executes:

a notification section that notifies the manager that collection of the new information item is started, in a case where the collection section is executed by the processor to start collection of the new information item by the pre-registration of the permission.

15. The image processing apparatus according to claim 14, wherein the processor executes the notification section to not perform the notification in a case where a message for the notification that collection of the information item starts is not designated with following the pre-registration of the permission for the information item.

16. The image processing apparatus according to claim 15, wherein the processor executes the permission acquisition section to receive a pre-registration of collection prohibition for the information item generated by the device capable of communicating with the image processing apparatus, from the manager, and the processor executes the collection section to not collect the new information item in a case where the pre-registration of the collection prohibition for the new information item whose collection is needed is provided.

17. The image processing apparatus according to claim 14, wherein the processor executes the permission acquisition section to receive a pre-registration of collection prohibition for the information item generated by the device capable of communicating with the image processing apparatus, from the manager, and the processor executes the collection section to not collect the new information item in a case where the pre-registration of the collection prohibition for the new information item whose collection is needed is provided.

18. The image processing apparatus according to claim 8, wherein the processor executes the permission acquisition section to receive a pre-registration of collection prohibition for the information item generated by the device capable of communicating with the image processing apparatus, from the manager, and the processor executes the collection section to not collect the new information item in a case where the pre-registration of the collection prohibition for the new information item whose collection is needed is provided.

19. The image processing apparatus according to claim 1, wherein the processor executes the collection section to not collect a not-collected information item until the processor executes the one information processing section to acquire permissions for a plurality of information items as processing targets, from the manager, even though acquisition of the permission for the not-collected information item among the plurality of information items is completed.

20. A non-transitory computer readable medium storing a program causing a processor of a computer provided in an image processing apparatus that performs a job relating to image processing to function as:

executing one or more information processing sections that perform processing on one or more information items as each of processing targets among information items generated by a device group;

executing a permission acquisition section that acquires a permission for each of one or more information items used by the one or more information processing sections, from a manager of the device group that generates the information items or the image processing apparatus; and executing a collection section that collects the information items used by the one or more information processing sections from devices that generate the information items, under a condition in which acquisition of the permission for each of the information items from the manager is completed.

* * * * *